United States Patent
Nagata et al.

(10) Patent No.: US 11,365,661 B2
(45) Date of Patent: Jun. 21, 2022

(54) EXHAUST GAS PURIFICATION SYSTEM

(71) Applicant: TOYOTA JIDOSHA KABUSHIKI KAISHA, Toyota (JP)

(72) Inventors: Naoto Nagata, Toyota (JP); Daisuke Shimoyama, Susono (JP)

(73) Assignee: TOYOTA JTDOSHA KABUSHIKI KATSHA, Toyota (JP)

( * ) Notice: Subject to any disclaimer, the term of this patent is extended or adjusted under 35 U.S.C. 154(b) by 0 days.

(21) Appl. No.: 17/081,133

(22) Filed: Oct. 27, 2020

(65) Prior Publication Data
US 2021/0164375 A1  Jun. 3, 2021

(30) Foreign Application Priority Data

Nov. 29, 2019 (JP) .............................. JP2019-216517

(51) Int. Cl.
*F01N 3/10* (2006.01)
*F01N 13/00* (2010.01)
*B01J 21/00* (2006.01)

(52) U.S. Cl.
CPC ............ *F01N 3/101* (2013.01); *F01N 3/106* (2013.01); *F01N 3/108* (2013.01); *F01N 13/009* (2014.06); *B01J 21/005* (2013.01); *F01N 2370/02* (2013.01); *F01N 2570/14* (2013.01)

(58) Field of Classification Search
CPC ........ F01N 3/101; F01N 13/009; F01N 3/106; F01N 3/108; F01N 2570/14; F01N 2370/02; F01N 2510/06; Y02T 10/12; B01D 53/94
See application file for complete search history.

(56) References Cited

U.S. PATENT DOCUMENTS

| 2015/0148216 A1* | 5/2015 | Nazarpoor ............. B01J 23/626 502/74 |
| 2017/0095801 A1* | 4/2017 | Nazarpoor ............. B01J 23/005 |
| 2017/0328249 A1* | 11/2017 | Nazarpoor ........... B01J 23/8986 |
| 2019/0207252 A1* | 7/2019 | Badding ................. H01L 23/15 |

FOREIGN PATENT DOCUMENTS

JP  2001-132440 A  5/2001

* cited by examiner

*Primary Examiner* — Brandon D Lee
(74) *Attorney, Agent, or Firm* — Sughrue Mion, PLLC (57) ABSTRACT

There is provided an exhaust gas purification system that allows efficient purification of NOx present in exhaust gas emitted from an internal combustion engine. The exhaust gas purification system of the disclosure comprises a first exhaust gas purification device that purifies exhaust gas emitted from an internal combustion engine, wherein the atmosphere alternately switches between a reducing agent-excess atmosphere and an oxidizing agent-excess atmosphere with respect to the stoichiometric atmosphere, and a second exhaust gas purification device that further purifies the exhaust gas that has been purified by the first exhaust gas purification device, wherein the first exhaust gas purification device has a three-way catalyst, and the second exhaust gas purification device has an exhaust gas purifying catalyst that comprises an $AMn_2O_4$ spinel-type oxide support (A=Mg, Zn or Li) on which a precious metal is supported.

5 Claims, 10 Drawing Sheets

EXHAUST GAS PURIFICATION SYSTEM

FIELD

The present disclosure relates to an exhaust gas purification system.

BACKGROUND

Exhaust gas emitted by internal combustion engines for automobiles and the like, such as gasoline engines or diesel engines, include components such as carbon monoxide (CO), hydrocarbons (HC) and nitrogen oxides (NOx). Vehicles with internal combustion engines are therefore usually provided with exhaust gas purification catalyst apparatuses for purification of such components, whereby the components are essentially purified by the exhaust gas purifying catalysts mounted in the exhaust gas purification catalyst apparatuses.

As a construction for an exhaust gas purification catalyst apparatus, PTL 1 discloses an exhaust gas purification device having a three-way catalyst disposed at the upstream end and a NOx storage/reduction catalyst disposed at the downstream end.

CITATION LIST

Patent Literature

[PTL 1] Japanese Unexamined Patent Publication No. 2001-132440

SUMMARY

Technical Problem

For exhaust gas from internal combustion engines in which combustion is carried out with an air/fuel ratio so that oxidizing agents such as NOx and reducing agents such as CO and HC are produced in a chemical equivalence ratio (theoretical air/fuel ratio) (throughout the present disclosure, this will also be referred to as "stoichiometric atmosphere exhaust gas"), it is ideal for the reaction and purification to proceed without excess or deficiency, using a three-way catalyst. For actual operation of an internal combustion engine, however, the air/fuel ratio fluctuates near the stoichiometric ratio, and consequently the exhaust gas atmosphere also fluctuates between an atmosphere with an excess of reducing agents such as CO and HC and an atmosphere with an excess of oxidizing agents such as $O_2$ and NOx.

It is common to use oxygen absorption/release materials such as ceria that store oxygen, in order to reduce the degree of compositional fluctuation of the exhaust gas.

The present inventors have studied the use of an exhaust gas purification system having in addition to a first exhaust gas purification device using such a three-way catalyst, also a second exhaust gas purification device that further purifies the exhaust gas that has been purified by the first exhaust gas purification device.

In this type of exhaust gas purification system, the components among the NOx, CO and HC in exhaust gas emitted from an internal combustion engine that could not be purified by the first exhaust gas purification device can be purified by the second exhaust gas purification device.

The exhaust gas purified by the first exhaust gas purification device can potentially have two different types of compositions, specifically, exhaust gas containing NOx that could not be completely purified, i.e. NOx atmosphere gas, and exhaust gas containing CO and HC that could not be completely purified, i.e. CO/HC atmosphere gas.

For a first exhaust gas purification device that has a fluctuating composition of exhaust gas being introduced, if there is an excess of oxidizing agent in exhaust gas from the engine, then $O_2$ is consumed by the oxygen absorption/release material, resulting in NOx atmosphere gas composed mainly of NOx flowing into the second exhaust gas purifying catalyst device. When there is an excess of reducing agent in the exhaust gas from the engine, the CO/HC atmosphere gas that could not be completely removed by the first exhaust gas purification device flows into the second exhaust gas purifying catalyst device.

In the second exhaust gas purification device, however, the NOx cannot coexist with the reducing agent such as CO/HC that is capable of reacting with it, while the CO/HC cannot coexist with the reducing agent capable of reacting with it, and this makes it difficult to purify the portions of the NOx, CO and HC that could not be completely purified in the first exhaust gas purification device.

It is therefore an object of this disclosure to provide an exhaust gas purification system that allows efficient purification of NOx, CO and HC present in exhaust gas emitted from an internal combustion engine, which alternately switches between a reducing agent-excess atmosphere and an oxidizing agent-excess atmosphere with respect to the stoichiometric atmosphere.

Solution to Problem

The present inventors have found that this object can be achieved by the following means.

<Aspect 1>

An exhaust gas purification system comprising:

a first exhaust gas purification device that purifies exhaust gas emitted from an internal combustion engine, in which a reducing agent-excess atmosphere and an oxidizing agent-excess atmosphere alternately switch with respect to the stoichiometric atmosphere, and a second exhaust gas purification device that further purifies the exhaust gas that has been purified by the first exhaust gas purification device, wherein:

the first exhaust gas purification device has a three-way catalyst, and the second exhaust gas purification device has an exhaust gas purifying catalyst that comprises an $AMn_2O_4$ spinel-type oxide support (A=Mg, Zn or Li) on which a precious metal is supported.

<Aspect 2>

The exhaust gas purification system according to aspect 1, wherein the precious metal is Pt or Rh.

<Aspect 3>

The exhaust gas purification system according to aspect 1 or 2, wherein the precious metal is Rh.

<Aspect 4>

The exhaust gas purification system according to any one of aspects 1 to 3, wherein A is Mg.

<Aspect 5>

The exhaust gas purification system according to any one of aspects 1 to 4, wherein the $AMn_2O_4$ spinel-type oxide support is a single phase.

Advantageous Effects of Invention

According to the disclosure it is possible to provide an exhaust gas purification system that allows efficient purification of NOx, CO and HC present in exhaust gas emitted from an internal combustion engine which alternately switches between a reducing agent-excess atmosphere and an oxidizing agent-excess atmosphere with respect to the stoichiometric atmosphere.

DESCRIPTION OF EMBODIMENTS

Embodiments of the disclosure will now be explained in detail. The disclosure is not limited to the embodiments described below, however, and various modifications may be implemented such as do not depart from the gist thereof.

The exhaust gas purification system of the disclosure comprises a first exhaust gas purification device that purifies exhaust gas emitted from an internal combustion engine, in which the atmosphere alternately switches between a reducing agent-excess atmosphere and an oxidizing agent-excess atmosphere with respect to the stoichiometric atmosphere, and a second exhaust gas purification device that further purifies the exhaust gas that has been purified by the first exhaust gas purification device, wherein the first exhaust gas purification device has a three-way catalyst, and the second exhaust gas purification device has an exhaust gas purifying catalyst that comprises an $AMn_2O_4$ spinel-type oxide support (A=Mg, Zn or Li) on which a precious metal is supported.

According to the disclosure, exhaust gas in a "stoichiometric atmosphere" is exhaust gas from an internal combustion engine in which, as mentioned above, combustion is carried out with an air/fuel ratio so that oxidizing agents such as $O_2$ and NOx and reducing agents such as CO and HC are produced in a chemical equivalence ratio (theoretical air/fuel ratio), and ideally the reaction and purification proceed without excess or deficiency, using a three-way catalyst. Thus, "an exhaust gas in a reducing agent-excess atmosphere with respect to the stoichiometric atmosphere" is exhaust gas with an excess of HC and CO compared to a stoichiometric atmosphere exhaust gas composition. Also, "an exhaust gas in an oxidizing agent-excess atmosphere with respect to the stoichiometric atmosphere" is exhaust gas with an excess of $O_2$ and NOx compared to a stoichiometric atmosphere exhaust gas composition.

Figure 1:
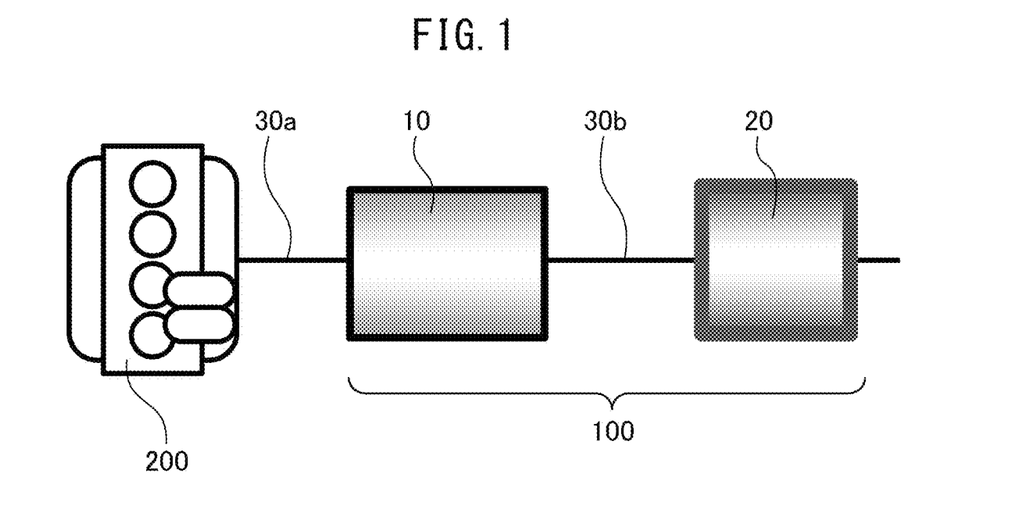
FIG. 1 is a schematic diagram showing an exhaust gas purification system 100 and internal combustion engine 200 according to one embodiment of the disclosure.

FIG. 1 shows an example of a specific construction for the exhaust gas purification system of the disclosure. FIG. 1 is a schematic diagram showing an exhaust gas purification system 100 and internal combustion engine 200 according to one embodiment of the disclosure.

As shown in FIG. 1, the exhaust gas purification system 100 according to one embodiment of the disclosure comprises a first exhaust gas purification device 10 that purifies exhaust gas emitted from an internal combustion engine 200, and a second exhaust gas purification device 20 that further purifies the exhaust gas purified by the first exhaust gas purification device 10. The first exhaust gas purification device 10 comprises a three-way catalyst. The second exhaust gas purification device 20 has an exhaust gas purifying catalyst that comprises an $AMn_2O_4$ spinel-type oxide support on which a precious metal is supported.

In FIG. 1, the internal combustion engine 200, first exhaust gas purification device 10 and second exhaust gas purification device 20 communicate by respective flow channels 30a, 30b. Thus, exhaust gas emitted by the internal combustion engine 200 first flows into the first exhaust gas purification device 10 through the flow channel 30a and is purified, after which the exhaust gas purified by the first exhaust gas purification device 10 flows into the second exhaust gas purification device 20 through the flow channel 30b and is further purified.

FIG. 1 is not intended to place any restrictions on the exhaust gas purification system of the disclosure.

Without being limited to any particular principle, it is believed that the principle by which the exhaust gas purification system of the disclosure can efficiently purify NOx in exhaust gas emitted from an internal combustion engine is as follows.

In the exhaust gas purification system of the disclosure, exhaust gas emitted from an internal combustion engine is first purified by the three-way catalyst in the first exhaust gas purification device.

When exhaust gas discharged from an internal combustion engine is exhaust gas with a reducing agent-excess atmosphere with respect to the stoichiometric atmosphere, the CO and HC in the exhaust gas discharged from the internal combustion engine cannot be completely purified by the first exhaust gas purification device because of the low amount of reactable oxidizing agent. Exhaust gas containing CO and HC that could not be completely purified, i.e. CO/HC atmosphere gas, therefore flows into the second exhaust gas purification device.

When the exhaust gas discharged from the internal combustion engine is exhaust gas with an oxidizing agent-excess atmosphere with respect to the stoichiometric atmosphere, $O_2$ in the exhaust gas discharged from the internal combustion engine is consumed by the oxygen absorption/release material in the first exhaust gas purification device. The exhaust gas flowing into the second exhaust gas purification device therefore has low $O_2$, and exhaust gas containing NOx that could not be completely purified by the first exhaust gas purification device, i.e. NOx atmosphere gas, flows into the second exhaust gas purification device.

This presumably causes CO/HC atmosphere gas and NOx atmosphere gas to alternately flow into the second exhaust gas purification device.

Figure 2A:
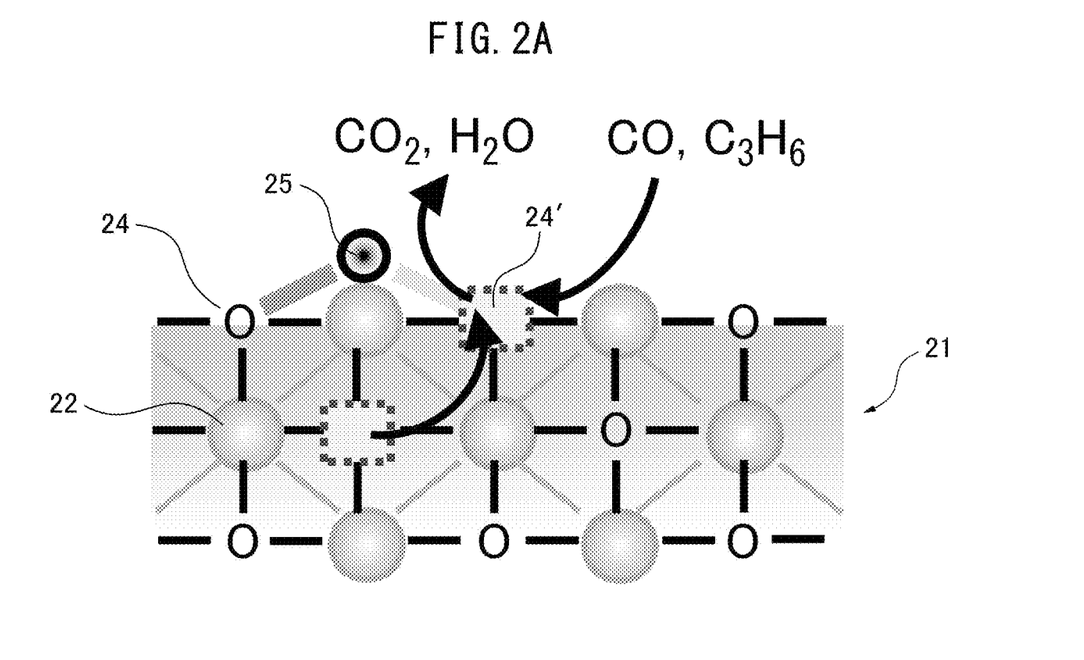
FIG. 2A is a schematic diagram showing the state of CO/HC atmosphere gas being purified by an $AMn_2O_4$ spinel-type oxide support 21 on which a precious metal 25 is supported.
Figure 2B:
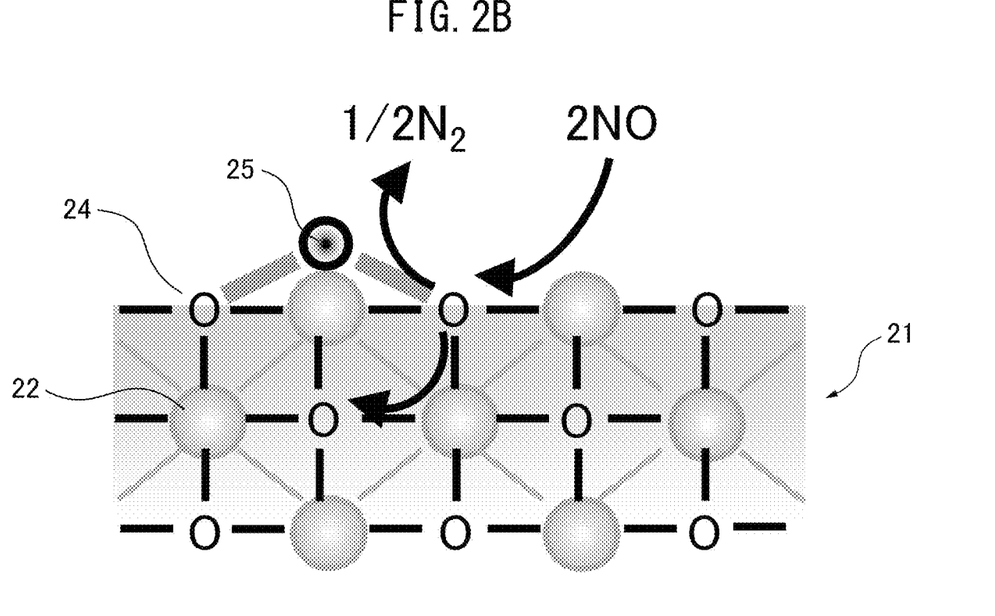
FIG. 2B is a schematic diagram showing the state of NOx atmosphere gas being purified by an $AMn_2O_4$ spinel-type oxide support 21 on which a precious metal 25 is supported.

In the exhaust gas purification system of the disclosure, as shown in FIGS. 2A and B, the second exhaust gas purification device has an exhaust gas purifying catalyst comprising an $AMn_2O_4$ spinel-type oxide support 21 on which a precious metal 25 is supported.

When CO/HC atmosphere gas flows into the second exhaust gas purification device therefore, as shown in FIG. 2A, the $AMn_2O_4$ spinel-type oxide support 21 acts as an oxidizing agent resulting in oxidation and purification of the CO and HC to $CO_2$ and $H_2O$, while at the same time, oxygen atoms 24 dissociate from the $AMn_2O_4$ spinel-type oxide support 21, forming oxygen vacancies 24' along with reduction of the metal that is coordinated at the B sites 22 in the spinel structure.

When NOx atmosphere gas flows into the second exhaust gas purification device, as shown in FIG. 2B, the $AMn_2O_4$ spinel-type oxide support 21 acts as a reducing agent, resulting in reduction of the NOx to $N_2$, while at the same time, the NOx delivers oxygen into the oxygen vacancies of the $AMn_2O_4$ spinel-type oxide support 21.

Since the second exhaust gas purification device in the exhaust gas purification system of the disclosure has an exhaust gas purifying catalyst comprising a precious metal-supporting $LaBO_3$ perovskite-type oxide support (B=Mn, Ni or Co), flow of CO/HC atmosphere gas into the second exhaust gas purification device allows the CO and HC to be purified, while inflow of NOx atmosphere gas allows the NOx to be purified.

<First Exhaust Gas Purification Device>

The first exhaust gas purification device is a device that purifies exhaust gas emitted from an internal combustion engine, which alternately switches between a reducing agent-excess atmosphere and an oxidizing agent-excess atmosphere with respect to the stoichiometric atmosphere. The first exhaust gas purification device comprises a three-way catalyst.

The first exhaust gas purification device may be in communication with the internal combustion engine, and specifically, the internal combustion engine and first exhaust gas purification device may be connected by a flow channel that distributes the exhaust gas.

<Three-Way Catalyst>

The three-way catalyst in the first exhaust gas purification device catalyzes oxidation reaction of HC and CO and reduction reaction of NOx in the exhaust gas emitted from the internal combustion engine, and it is not particularly restricted so long as it is a catalyst capable of simultaneously removing these components in exhaust gas. Such a three-way catalyst may be a catalyst having precious metal particles such as Rh, Pt or Pd supported on metal oxide support particles comprising a combination of alumina, ceria and zirconia. The three-way catalyst may comprise metal oxide particles having an oxygen storing function, such as ceria.

<Second Exhaust Gas Purification Device>

The second exhaust gas purification device is a device that further purifies the exhaust gas that has been purified by the first exhaust gas purification device. The second exhaust gas purification device has an exhaust gas purifying catalyst that comprises an $AMn_2O_4$ spinel-type oxide support (A=Mg, Zn or Li) on which a precious metal is supported.

The second exhaust gas purification device may be in communication with the first exhaust gas purification device, and specifically, the first exhaust gas purification device and second exhaust gas purification device may be connected by a flow channel that distributes the exhaust gas that has been purified by the first exhaust gas purification device.

<Exhaust Gas Purifying Catalyst>

The exhaust gas purifying catalyst of the second exhaust gas purification device comprises an $AMn_2O_4$ spinel-type oxide support (A=Mg, Zn or Li) on which a precious metal is supported.

($AMn_2O_4$ Spinel-Type Oxide Support)

The $AMn_2O_4$ spinel-type oxide support is a support made of a spinel-type oxide. In the chemical formula, A is selected from among Mg, Zn and Li. However, A is preferably Mg.

The $AMn_2O_4$ spinel-type oxide support may also be a single phase.

The $AMn_2O_4$ spinel-type oxide support may also have a composition that deviates from A:Mn:O=1:2:4, in a range that still maintains a spinel structure.

(Precious Metal)

The precious metal may be any precious metal that when loaded on a spinel-type oxide support can be used as a catalyst metal to catalyze reaction for reduction of NOx, and reaction for oxidation of HC and CO. Examples of such precious metals to be used include, but are not limited to, platinum-group elements, and specifically Rh, Pt and/or Pd.

The precious metal is preferably Rh. This is because it has higher purifying activity than other supported precious metals, and therefore using Rh as the precious metal and a $MgMn_2O_4$ spinel-type oxide support as the $AMn_2O_4$ spinel-type oxide support further increases the purifying activity.

(Method for Producing Exhaust Gas Purifying Catalyst)

The $AMn_2O_4$ spinel-type oxide support on which the precious metal is supported can be produced by loading the precious metal onto the $AMn_2O_4$ spinel-type oxide support.

There are no particular restrictions on the method of producing the $AMn_2O_4$ spinel-type oxide support, and any method can be used that allows production of a spinel-type oxide. The $AMn_2O_4$ spinel-type oxide support can be prepared by a suitable method for preparing composite oxides, such as coprecipitation, the citric acid complex method or the alkoxide method.

As a more specific example, a $MgMn_2O_4$ spinel-type oxide support can be obtained by dissolving magnesium nitrate hexahydrate $Mg(NO_3)_2 \cdot 6H_2O$ and manganese nitrate hexahydrate $Mn(NO_3)_2 \cdot 6H_2O$ in distilled water, and then dissolving it in citric acid and heating and stirring the solution to obtain a slurry, and finally drying and firing the slurry.

There are no particular restrictions on the method of loading the precious metal onto the $AMn_2O_4$ spinel-type oxide support, and any desired method can be used that allows a catalyst metal to be loaded onto a support. Loading of the precious metal onto the $AMn_2O_4$ spinel-type oxide support can be carried out, for example, by dispersing the $AMn_2O_4$ spinel-type oxide support in a solution containing the catalyst metal at a predetermined concentration, and drying and firing the dispersion.

EXAMPLES

Examples 1 to 6 and Comparative Examples 1 to 14

Example 1: $Pt/MgMn_2O_4$

After weighing out 12.82 g (0.05 mol) of $Mg(NO_3)_2.6H_2O$ and 28.70 g (0.1 mol) of $Mn(NO_3)_2.6H_2O$, they were dissolved in 100 mL of distilled water, and then 28.82 g of citric acid was dissolved in to obtain a solution. The solution was heated and stirred at 85° C. for 4 hours, and the obtained slurry was dried at 120° C. for 8 hours to obtain a paste. After calcining the obtained paste at 300° C. for 2 hours, it was fired at 750° C. for 5 hours to obtain a $MgMn_2O_4$ spinel-type oxide support powder.

The $MgMn_2O_4$ spinel-type oxide support powder was added to and dispersed in a Pt solution to a Pt loading mass of 0.5 mass %, and the dispersing medium was removed by heating while stirring to obtain a Pt-loaded $MgMn_2O_4$ spinel-type oxide support powder. After drying the powder at 120° C. for 12 hours, it was fired in an electric furnace at 500° C. for 2 hours to obtain a catalyst powder.

The catalyst powder was subjected to powder compacting at 2 $t/cm^2$, fabricating evaluation pellets for Example 1 having sizes of (21.0 to 1.7 mm.

Example 2: $Rh/MgMn_2O_4$

Evaluation pellets for Example 2 were fabricated in the same manner as Example 1, except that a Rh solution was used instead of the Pt solution.

Example 3: $Pt/ZnMn_2O_4$

Evaluation pellets for Example 3 were fabricated in the same manner as Example 1, except that the support was prepared using 14.87 g (0.05 mol) of $Zn(NO_3)_2.6H_2O$ and 28.70 g (0.1 mol) of $Mn(NO_3)_2.6H_2O$.

Example 4: $Rh/ZnMn_2O_4$

Evaluation pellets for Example 4 were fabricated in the same manner as Example 3, except that a Rh solution was used instead of the Pt solution.

Example 5: $Pt/LiMn_2O_4$

Evaluation pellets for Example 5 were fabricated in the same manner as Example 1, except that the support was prepared using 3.45 g (0.05 mol) of $LiNO_3$ and 28.70 g (0.1 mol) of $Mn(NO_3)_2.6H_2O$.

Example 6: $Rh/LiMn_2O_4$

Evaluation pellets for Example 6 were fabricated in the same manner as Example 5, except that a Rh solution was used instead of the Pt solution.

Comparative Example 1: $Pt/MgFe_2O_4$

Evaluation pellets for Comparative Example 1 were fabricated in the same manner as Example 1, except that the support was prepared using 12.82 g (0.05 mol) of $Mg(NO_3)_2.6H_2O$ and 40.40 g (0.1 mol) of $Fe(NO_3)_3.9H_2O$.

Comparative Example 2: $Rh/MgFe_2O_4$

Evaluation pellets for Comparative Example 2 were fabricated in the same manner as Comparative Example 1, except that a Rh solution was used instead of the Pt solution.

Comparative Example 3: $Pt/ZnFe_2O_4$

Evaluation pellets for Comparative Example 3 were fabricated in the same manner as Example 1, except that the support was prepared using 14.87 g (0.05 mol) of $Zn(NO_3)_2.6H_2O$ and 40.40 g (0.1 mol) of $Fe(NO_3)_3.9H_2O$.

Comparative Example 4: $Rh/ZnFe_2O_4$

Evaluation pellets for Comparative Example 4 were fabricated in the same manner as Comparative Example 3, except that a Rh solution was used instead of the Pt solution.

Comparative Example 5: $Pt/MgCo_2O_4$

Evaluation pellets for Comparative Example 5 were fabricated in the same manner as Example 1, except that the support was prepared using 12.82 g (0.05 mol) of $Mg(NO_3)_2.6H_2O$ and 29.10 g (0.1 mol) of $Co(NO_3)_3.9H_2O$.

Comparative Example 6: $Rh/MgCo_2O_4$

Evaluation pellets for Comparative Example 6 were fabricated in the same manner as Comparative Example 5, except that a Rh solution was used instead of the Pt solution.

Comparative Example 7: $Pt/ZnCo_2O_4$

Evaluation pellets for Comparative Example 7 were fabricated in the same manner as Example 1, except that the support was prepared using 14.87 g (0.05 mol) of $Zn(NO_3)_2.6H_2O$ and 29.10 g (0.1 mol) of $Co(NO_3)2.6H_2O$.

Comparative Example 8: $Rh/ZnCo_2O_4$

Evaluation pellets for Comparative Example 8 were fabricated in the same manner as Comparative Example 7, except that a Rh solution was used instead of the Pt solution.

Comparative Example 9: $Pt/MgCr_2O_4$

Evaluation pellets for Comparative Example 9 were fabricated in the same manner as Example 1, except that the support was prepared using 12.82 g (0.05 mol) of $Mg(NO_3)_2 \cdot 6H_2O$ and 40.02 g (0.1 mol) of $Cr(NO_3)_3 \cdot 9H_2O$.

Comparative Example 10: $Rh/MgCr_2O_4$

Evaluation pellets for Comparative Example 10 were fabricated in the same manner as Comparative Example 9, except that a Rh solution was used instead of the Pt solution.

Comparative Example 11: $Pt/ZnCr_2O_4$

Evaluation pellets for Comparative Example 11 were fabricated in the same manner as Example 1, except that the support was prepared using 14.87 g (0.05 mol) of $Zn(NO_3)_2 \cdot 6H_2O$ and 40.02 g (0.1 mol) of $Cr(NO_3)3 \cdot 9H_2O$.

Comparative Example 12: $Rh/ZnCr_2O_4$

Evaluation pellets for Comparative Example 12 were fabricated in the same manner as Comparative Example 11, except that a Rh solution was used instead of the Pt solution.

Comparative Example 13: $Pt/Ce\text{—}ZrO_2$

Evaluation pellets for Comparative Example 13 were fabricated in the same manner as Example 1, except that a cerium oxide-zirconium composite oxide (Ce/Zr=3/7, SBET=70 $m^2/g$) was used as the support.

Comparative Example 14: $Rh/Ce\text{—}ZrO_2$

Evaluation pellets for Comparative Example 14 were fabricated in the same manner as Comparative Example 13, except that a Rh solution was used instead of the Pt solution.

<Structural Analysis by XRD>

The evaluation pellets of Examples 1 to 6 and Comparative Examples 1 to 12 were subjected to structural analysis by XRD.

(Method)

Structural analysis by XRD was carried out using an RINT2000 by Rigaku Corp., with CuKα ($\lambda$=1.5418 nm) as the X-ray source, a scanning zone of 10 to 90 deg, a step width of 0.02 deg, a tube voltage of 50 kV and a tube current of 300 mA. The diffraction peak position was compared with known data from the JCPDS data file.

(Results)

Figure 3:
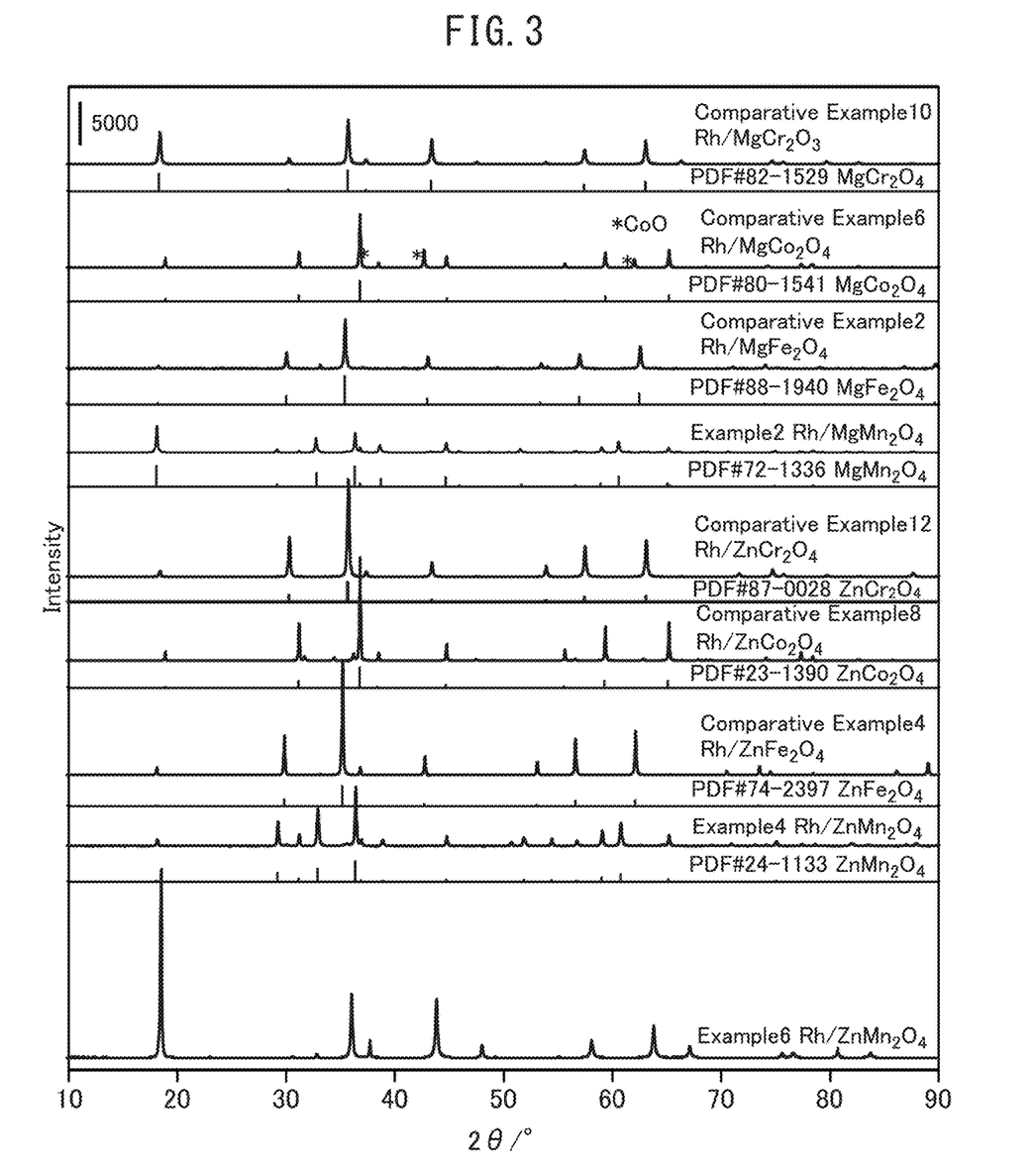
FIG. 3 is an XRD diffraction pattern of the samples of Examples 2, 4 and 6 and Comparative Examples 2, 4, 6, 8, 10 and 12.

FIG. 3 shows XRD diffraction patterns for Rh-loaded samples (Examples 2, 4 and 6, and Comparative Examples 2, 4, 6, 8, 10 and 12). Spinel-type $AB_2O_4$ diffraction lines were also detected from all of the sample diffraction patterns, confirming that essentially single-phase products of the oxides had formed.

While not shown in the graph, similar diffraction patterns were also obtained for the Pt-loaded samples (Examples 1, 3 and 5 and Comparative Examples 1, 3, 5, 7, 9 and 11), likewise confirming formation of single-phase products.

<Specific Surface Area Analysis>

The samples of Examples 1 to 6 and Comparative Examples 1 to 14 were measured for specific surface area.

(Method)

The specific surface area was measured by the nitrogen adsorption/desorption method at a temperature of 77 K, using a BELSORP-max-12-N-VP by Bel Japan, Inc. Each sample was subjected to vacuum treatment at 250° C. for 3 hours. The specific surface area was calculated from the linear portion of the BET curve.

(Results)

Table 1 shows the measurement results for the specific surface areas of the samples of the Examples.

TABLE 1

| Example | Sample composition | Specific surface area ($S_{BET}/m^2 g^{-1}$) |
|---|---|---|
| Example 1 | $Pt/MgMn_2O_4$ | 11 |
| Example 2 | $Rh/MgMn_2O_4$ | 11 |
| Example 3 | $Pt/ZnMn_2O_4$ | 9 |
| Example 4 | $Rh/ZnMn_2O_4$ | 9 |
| Example 5 | $Pt/LiMn_2O_4$ | 8 |
| Example 6 | $Rh/LiMn_2O_4$ | 8 |
| Comparative Example 1 | $Pt/MgFe_2O_4$ | 7 |
| Comparative Example 2 | $Rh/MgFe_2O_4$ | 7 |
| Comparative Example 3 | $Pt/ZnFe_2O_4$ | 5 |
| Comparative Example 4 | $Rh/ZnFe_2O_4$ | 5 |
| Comparative Example 5 | $Pt/MgCo_2O_4$ | 5 |
| Comparative Example 6 | $Rh/MgCo_2O_4$ | 5 |
| Comparative Example 7 | $Pt/ZnCo_2O_4$ | 4 |
| Comparative Example 8 | $Rh/ZnCo_2O_4$ | 4 |
| Comparative Example 9 | $Pt/MgCr_2O_4$ | 25 |
| Comparative Example 10 | $Rh/MgCr_2O_4$ | 25 |
| Comparative Example 11 | $Pt/ZnCr_2O_4$ | 14 |
| Comparative Example 12 | $Rh/ZnCr_2O_4$ | 14 |
| Comparative Example 13 | $Pt/Ce\text{—}ZrO_2$ | 71 |
| Comparative Example 14 | $Rh/Ce\text{—}ZrO_2$ | 71 |

As shown in Table 1, the ceria-zirconia oxides (Comparative Examples 13 and 14), of types that are currently being implemented as three-way catalyst materials, had specific surface areas of 71 $m^2 g^{-1}$, while the other perovskite-type oxides (Examples 1 to 6 and Comparative Examples 1 to 12) had smaller values.

<NOx Reducing Activity Test>

The samples of Examples 1 to 6 and Comparative Examples 1 to 14 were measured for NOx reducing activity.

(Method)

The NOx reducing activity was determined by placing each sample (4 g) in a flow reactor and analyzing the conversion behavior of each gas with an FT-IR analyzer (SESAM-HL by Best Sokki, Ltd.). After reduction pretreatment at 450° C. for 5 minutes, the lean gas and rich gas shown in Table 2 below (nitrogen gas balance) were each successively introduced in five 60-second cycles at 20 L/min, and the mean values for 2 to 5 cycles of NOx reduction during the lean period were compared. The evaluation was conducted at a temperature of 450° C. or 300° C. When varying the evaluation temperature, 1% $H_2/N_2$ was circulated through at the same flow rate.

TABLE 2

| | Gas composition (vol %) | | | | | | |
|---|---|---|---|---|---|---|---|
| Type of gas | $H_2$ | NO | CO | $C_3H_6$ | $H_2O$ | $CO_2$ | $N_2$ |
| Pretreatment gas | 1 | — | — | — | — | — | Remainder |
| NO atmosphere gas | — | 0.2 | — | — | 4 | 10 | Remainder |
| CO/HC atmosphere gas | — | — | 0.1 | 0.011 | 4 | 10 | Remainder |

(Results)

Figure 4A:
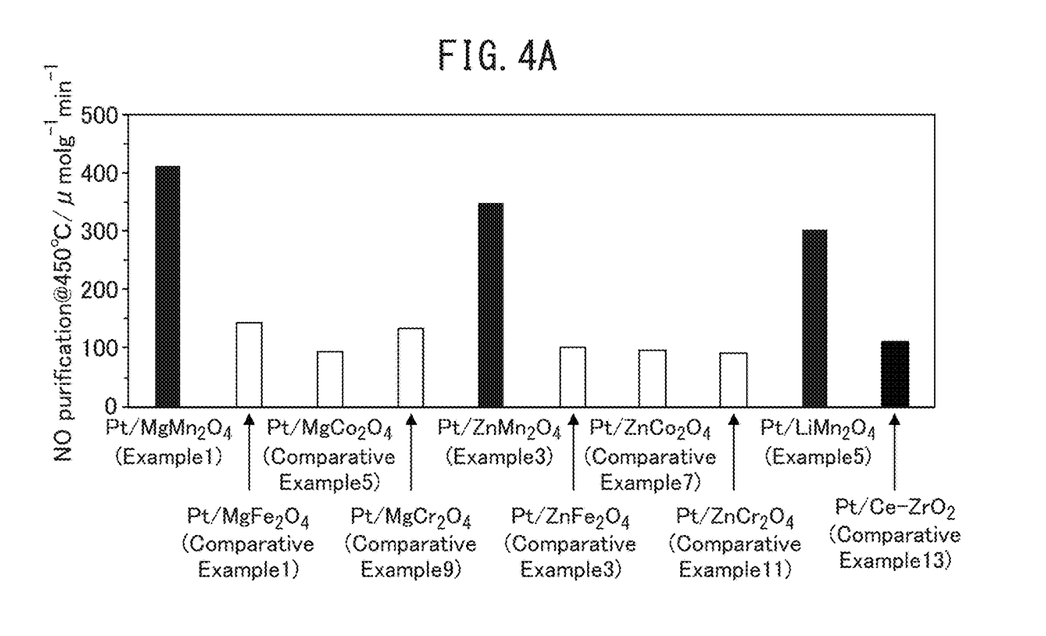
FIG. 4A is a graph showing NO reduction amounts at 450° C., for the samples of Examples 1, 3 and 5 and Comparative Examples 1, 3, 5, 7, 9, 11 and 13.
Figure 4B:
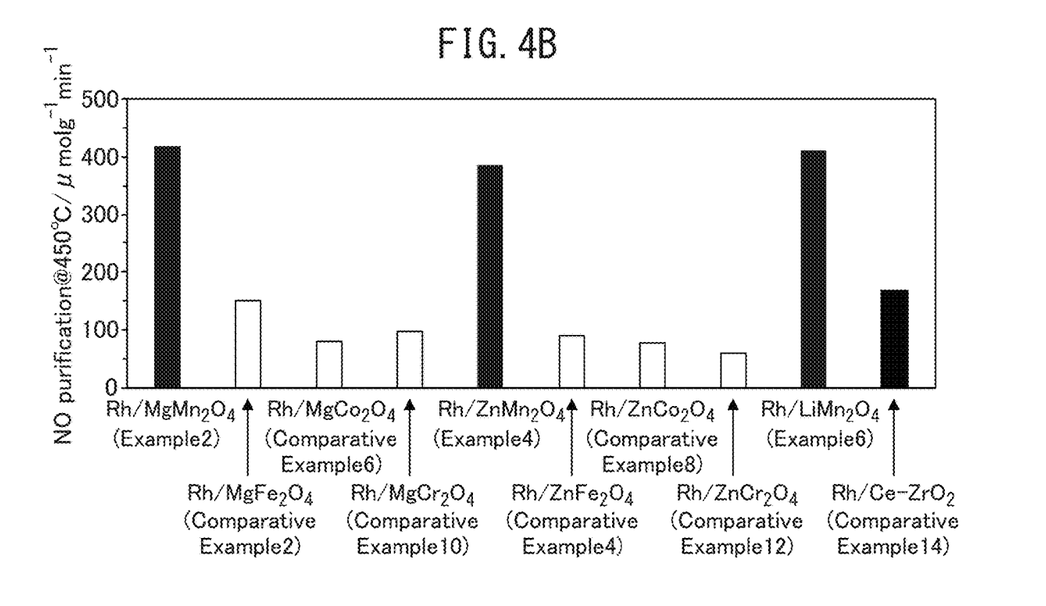
FIG. 4B is a graph showing NO reduction amounts at 450° C., for the samples of Examples 2, 4 and 6, and Comparative Examples 2, 4, 6, 8, 10, 12 and 14.
Figure 5A:
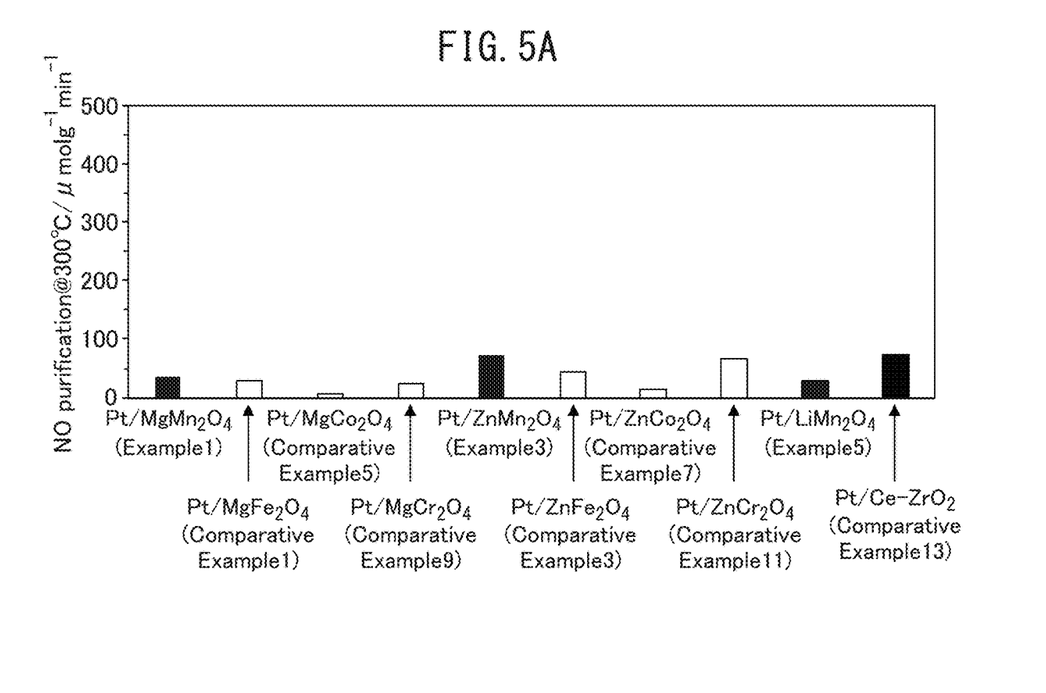
FIG. 5A is a graph showing NO reduction amounts at 300° C., for the samples of Examples 1, 3 and 5 and Comparative Examples 1, 3, 5, 7, 9, 11 and 13.

The test results are shown in FIGS. 4A and B and in FIGS. 5A and B.

FIGS. 4A and B are graphs showing NO reduction amounts for each sample at 450° C.

As shown in FIG. 4A, in comparing the Pt-loaded samples, it was found that the sample of Example 1 (Pt/$MgMn_2O_4$), the sample of Example 3 (Pt/$ZnMn_2O_4$) and the sample of Example 5 (Pt/LiMn$_2$O$_4$) had high NO reducing activity, even exhibiting high activity compared to the sample of Comparative Example 13 (Pt/Ce—ZrO$_2$) that used a ceria-zirconia-based oxide as the support, which is a type used in currently implemented three-way catalysts.

Among the samples of Examples 1, 3 and 5, the highest NO reducing activity was exhibited by the sample of Example 1 wherein A in the AMn$_2$O$_4$ spinel-type oxide support was Mg.

As shown in FIG. 4B, in comparing the Rh-loaded samples, it was found that the sample of Example 2 (Rh/MgMn$_2$O$_4$), the sample of Example 4 (Rh/ZnMn$_2$O$_4$) and the sample of Example 6 (Rh/LiMn$_2$O$_4$) had high NO reducing activity, even exhibiting high activity compared to the sample of Comparative Example 14 (Rh/Ce—ZrO$_2$) that used a ceria-zirconia-based oxide as the support.

Among the samples of Examples 2, 4 and 6, the highest NO reducing activity was exhibited by the sample of Example 2 wherein A in the AMn$_2$O$_4$ spinel-type oxide support was Mg.

While not shown in the graph, for each Example, a NO reducing activity test was also conducted using a support without a precious metal, but none of them exhibited NO reducing activity.

Figure 5B:
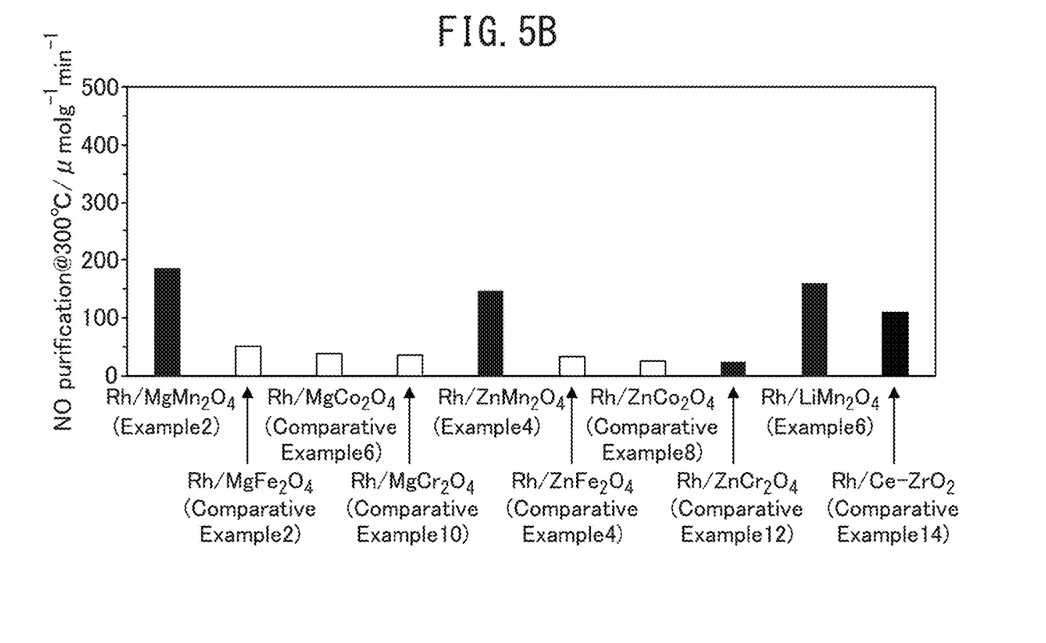
FIG. 5B is a graph showing NO reduction amounts at 300° C., for the samples of Examples 2, 4 and 6, and Comparative Examples 2, 4, 6, 8, 10, 12 and 14.

FIGS. 5A and B are graphs showing NO reduction amounts for each sample at 300° C.

As shown in FIG. 5A, in comparing the Pt-loaded samples, it was found that the sample of Example 1 (Pt/MgMn$_2$O$_4$), the sample of Example 3 (Pt/ZnMn$_2$O$_4$) and the sample of Example 5 (Pt/LiMn$_2$O$_4$) had NO reducing activity that was about the same as that of the sample of Comparative Example 13 (Pt/Ce—ZrO$_2$) that used a ceria-zirconia-based oxide as the support, which is a type used in currently implemented three-way catalysts.

In contrast, as shown in FIG. 5B, in comparing the Rh-loaded samples, it was found that the sample of Example 2 (Rh/MgMn$_2$O$_4$), the sample of Example 4 (Rh/ZnMn$_2$O$_4$) and the sample of Example 6 (Rh/LiMn$_2$O$_4$) had high NO reducing activity, even exhibiting high activity compared to the sample of Comparative Example 14 (Rh/Ce—ZrO$_2$) that used a ceria-zirconia-based oxide as the support.

<CO—NO Titration Test>

The temperature dependence of NO and CO conversion was examined during a CO—NO titration test for the sample of Example 2.

(Method)

For CO—NO titration, 2 g of the sample of Example 2 (Rh/MgMn$_2$O$_4$) was placed in a flow reactor and subjected to reduction pretreatment at 450° C. for 5 minutes, after which 0.4% NO gas and 0.4% CO gas (with the remainder nitrogen gas in both) were successively introduced in five 60-second cycles at 10 L/min each, and the gas conversions for 2 to 5 cycles were compared. The conversion behavior of each gas was analyzed with an FT-IR analyzer (SESAM-HL by Best Sokki, Ltd.).

(Results)

Figure 6A:
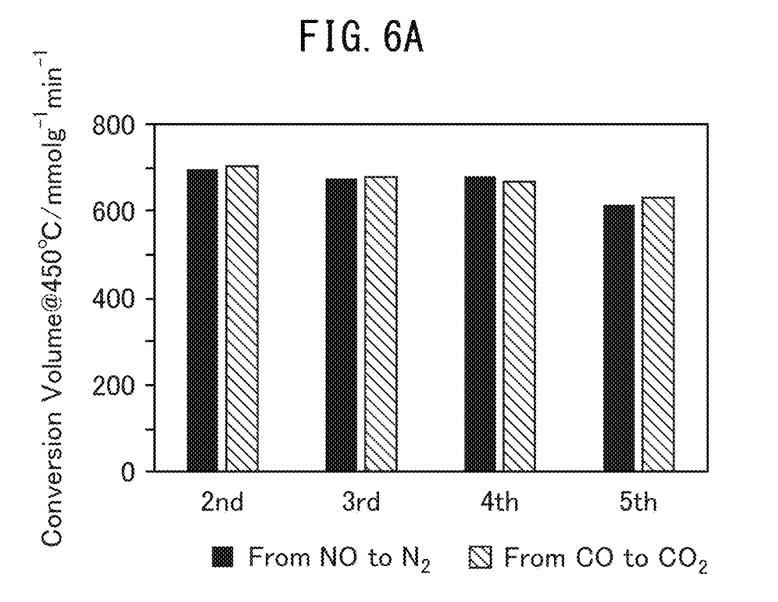
FIG. 6A shows the experimental results of titration by introducing 0.4% NO gas and 0.4% CO gas in 5 pulses into 2 g of the sample of Example 1 ($Rh/MgMn_2O_4$), at 450° C.
Figure 6B:
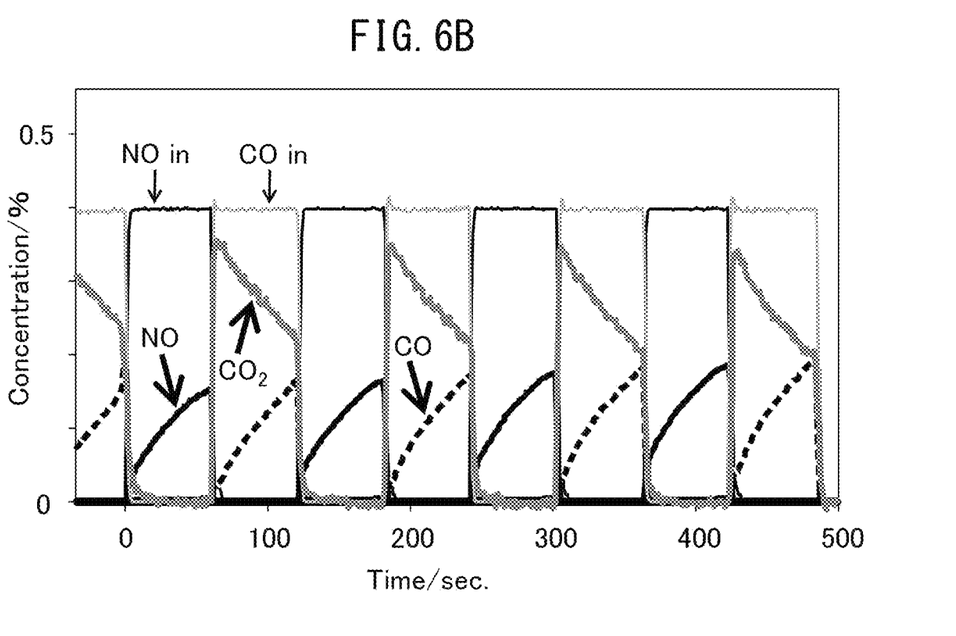
FIG. 6B is a graph showing time-dependent change in each gas concentration for 5 cycles, when 0.4% NO gas and 0.4% CO gas were introduced in 5 pulses into 2 g of the sample of Example 1 ($Rh/MgMn_2O_4$), as 450° C.

FIG. 6A shows titration test results when 0.4% NO gas and 0.4% CO gas were introduced in 5 pulses into 2 g of the sample of Example 2 (Rh/MgMn$_2$O$_4$), as 450° C., and FIG. 6B shows the time-dependent change in the 0.4% NO gas and 0.4% CO gas concentrations during the 5 cycles.

As shown in FIGS. 6A and B, the amount of the conversion from NO to N$_2$ and the amount of the conversion from CO to CO$_2$ almost completely matched at all temperatures.

This test was carried out under conditions where NO and CO were not copresent, and only the sample of Example 2 (Rh/MgMn$_2$O$_4$) was found to be able to serve as a NO reducing agent or CO oxidizing agent.

These test results suggest that under CO/HC atmosphere gas circulation, the AMn$_2$O$_4$ spinel-type oxide support is reduced by the reducing agent to form oxygen vacancies, while under NOx atmosphere gas circulation, the oxygen vacancies act as active sites which reduces NO.

<H$_2$-TPR Analysis>

H$_2$-TPR analysis was carried out for the samples of Examples 1 and 5 and Comparative Examples 1, 3, 5 and 7.

(Method)

Belcat A by Bel Japan, Inc. was used for the measurement. After weighing out approximately 50 mg of sample powder of each Example and introducing it into a sample tube, 20 vol % O$_2$/He was circulated at 30 mL/min and the temperature was raised to 600° C., after which the temperature was maintained for 10 minutes and the contents were cooled to about −80° C. under the same atmosphere. After then exchanging the atmosphere with Ar gas at −80° C., 5 vol % H$_2$/Ar was circulated at 30 mL/min and the sample was heated at 10° C./min while raising the temperature to 600° C., and the H$_2$ consumption was analyzed. Analysis was conducted by TCD, placing a dry material at the early stage of TCD to trap the water that formed. The same analysis was conducted using CuO powder, and the H$_2$ consumption was quantified for the sample of each Example.

(Results)

Figure 7A:
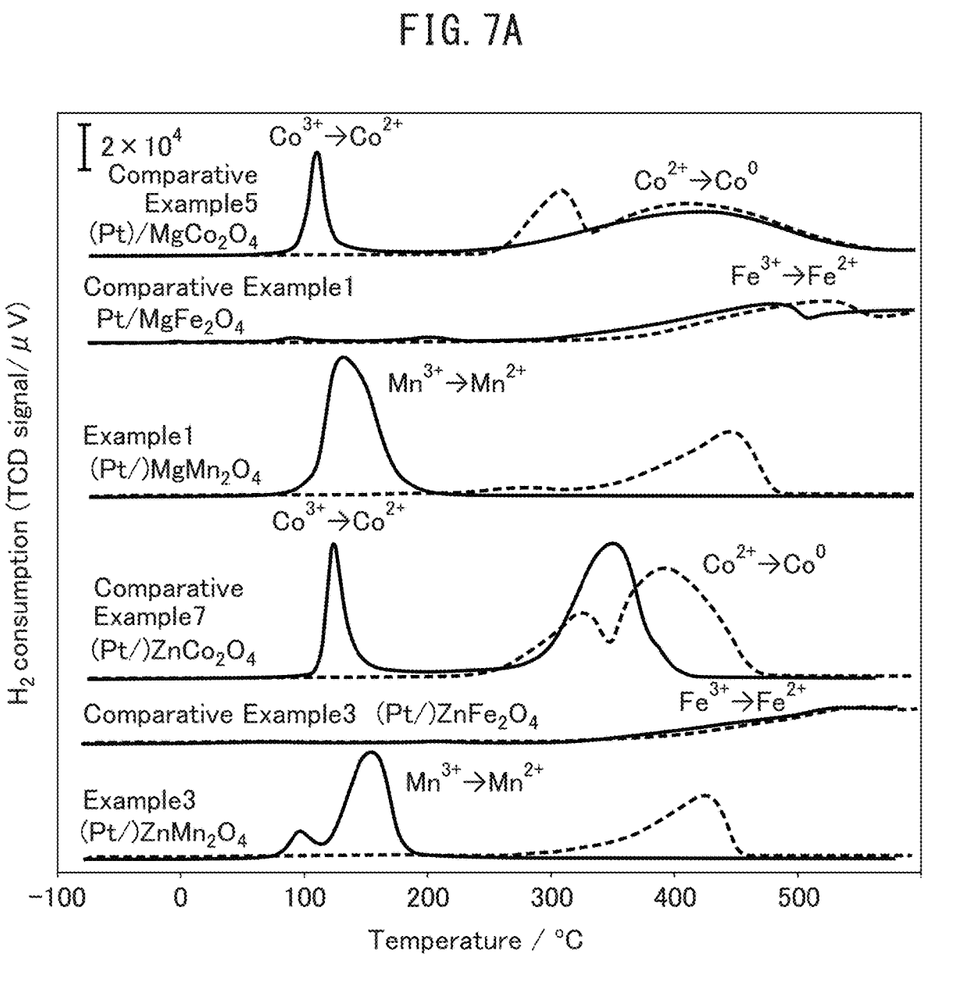
FIG. 7A is a graph showing the results of analyzing the reductive power of actual catalysts by $H_2$-TPR analysis of the samples of Examples 1 and 3 and Comparative Examples 1, 3, 5 and 7, and their precious metal unsupported oxides.

FIG. 7A shows the results of analyzing the catalyst reductive power of the sample of Example 1 (Pt/MgMn$_2$O$_4$), the sample of Comparative Example 1 (Pt/MgFe$_2$O$_4$) and the sample of Comparative Example 3 (Pt/MgCo$_2$O$_4$), as Pt/MgB$_2$O$_4$-based catalysts, as well as the sample of Example 3 (Pt/ZnMn$_2$O$_4$), the sample of Comparative Example 3 (Pt/ZnFe$_2$O$_4$) and the sample of Comparative Example 7 (Pt/ZnCo$_2$O$_4$), as Pt/ZnB$_2$O$_4$-based catalysts, and their precious metal unsupported oxides, by H$_2$-TPR analysis.

The hydrogen consumption profiles of the non-supporting samples indicated by the broken lines showed broad hydrogen consumption at 600° C. and below, and also two peaks detected from 250 to 600° C. for MgCo$_2$O$_4$ and ZnCo$_2$O$_4$ which contained Co. This suggested stepwise reduction proceeding from Co$^{3+}$. The hydrogen consumption α at the low-temperature end is believed to be hydrogen consumption due to single-electron reduction of Co$^{3+}$ ion, while that at the high-temperature end is believed to be due to formation of O-valent metal formation by two-electron reduction of the reduced Co$^{2+}$ metal ion.

When Pt was supported, the hydrogen consumption α at the low-temperature end was sharp but shifted significantly toward the low-temperature end. This indicates that the support powerfully interacted with the Pt, tending to result in single-electron reduction of the transition metal ion, i.e. tending to form oxygen vacancies.

Figure 7B:
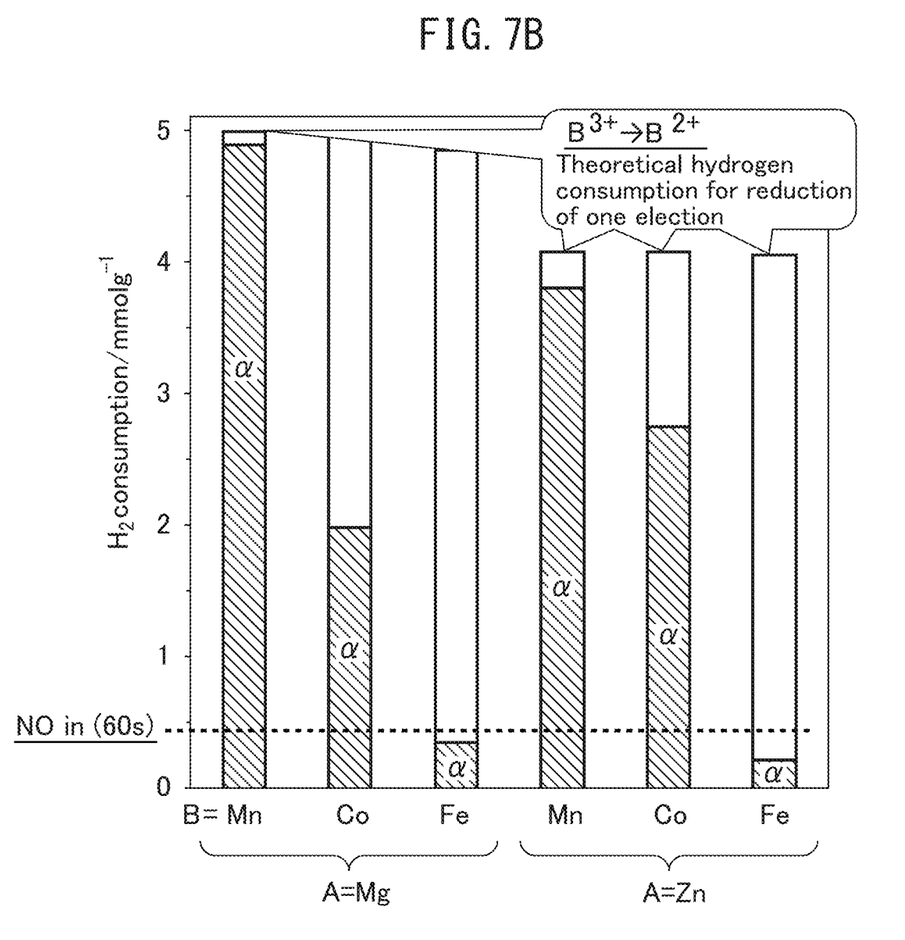
FIG. 7B is a graph showing the results of quantifying hydrogen consumption α at the low-temperature end, for the samples of Examples 1 and 3 and Comparative Examples 1, 3, 5 and 7.

FIG. 7B shows the results of quantifying hydrogen consumption α at the low-temperature end for Pt/MgB$_2$O$_4$-based catalysts (Example 1 and Comparative Examples 1 and 5) and Pt/ZnB$_2$O$_4$-based catalysts (Example 3 and Comparative Examples 3 and 7).

As shown in FIG. 7B, the hydrogen consumption α was high with the sample of Example 1 (Pt/MgMn$_2$O$_4$) and the sample of Example 3 (Pt/ZnMn$_2$O$_4$), suggesting high oxygen vacancy formation per weight of the catalyst. Since the hydrogen consumption α values were near theoretical consumption, with almost all of the Mn having undergone single-electron reduction at 250° C. and below, in a greater amount than the NO introduction per cycle under these test conditions, it is concluded that the samples of Examples 1 and 3 retain ability to form oxygen vacancies that can reduce NO at 250° C. and below.

On the other hand, since the hydrogen consumption α was very low with the sample of Comparative Example 1 (Pt/ $MgFe_2O_4$) and the sample of Comparative Example 3 (Pt/ $ZnFe_2O_4$), and there was virtually no change in reduction of Fe even with loading of Pt, this suggests that oxygen vacancies could not be formed, lowering the activity.

<NO-TPO Analysis>

The NO reactivity of oxygen vacancies formed in the samples of Example 1 and Comparative Examples 1 and 5 was examined by the NO temperature-programmed oxidation method (NO-TPO).

(Method)

Belcat A by Bel Japan, Inc. was used for the analysis. After introducing 300 mg of the sample powder into a sample tube for analysis, 1 vol % $H_2$/He was circulated at 30 mL/min and the temperature was raised to 600° C. and then maintained for 10 minutes, and the contents were cooled to about −80° C. under the same atmosphere. After then exchanging the atmosphere in the sample tube with $N_2$ gas at −80° C., 5 vol % NO/He was circulated at 30 mL/min, and the sample was heated at 10° C./min while raising the temperature to 600° C., and reactivity with NO was analyzed.

(Results)

Figure 8A:
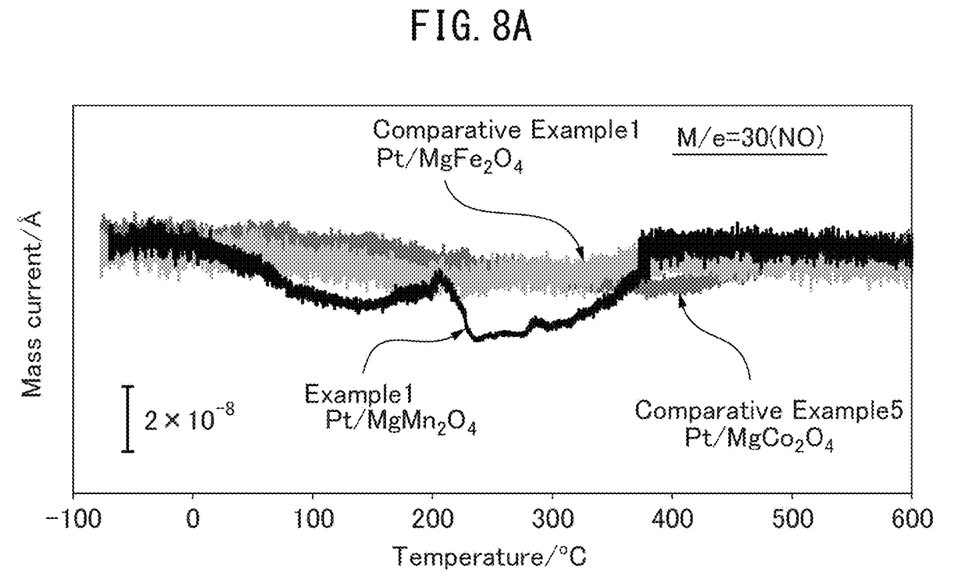
FIG. 8A is a graph showing NO-TPO analysis results for the samples of Examples 1 and Comparative Examples 1 and 5.
Figure 8B:
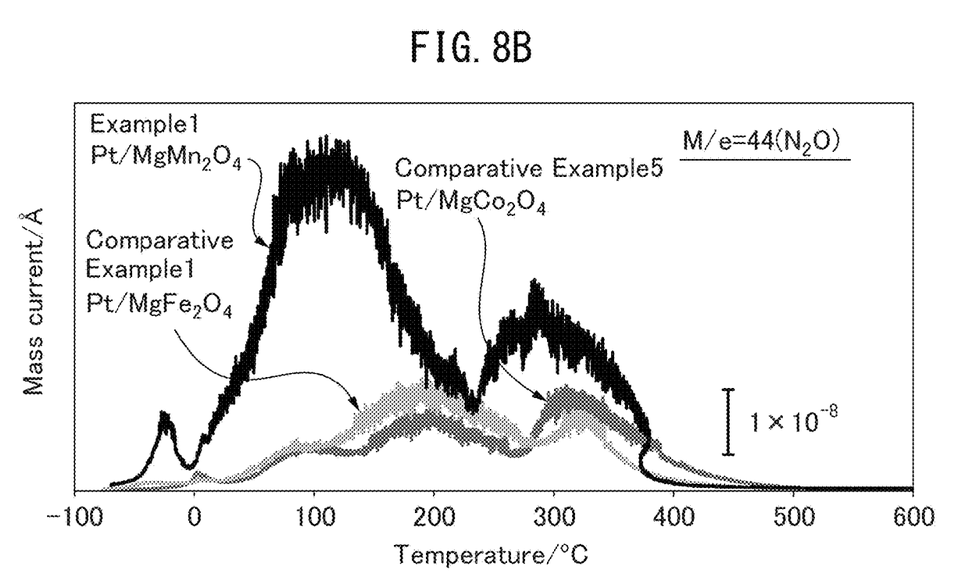
FIG. 8B is a graph showing NO-TPO analysis results for the samples of Examples 1 and Comparative Examples 1 and 5.
Figure 8C:
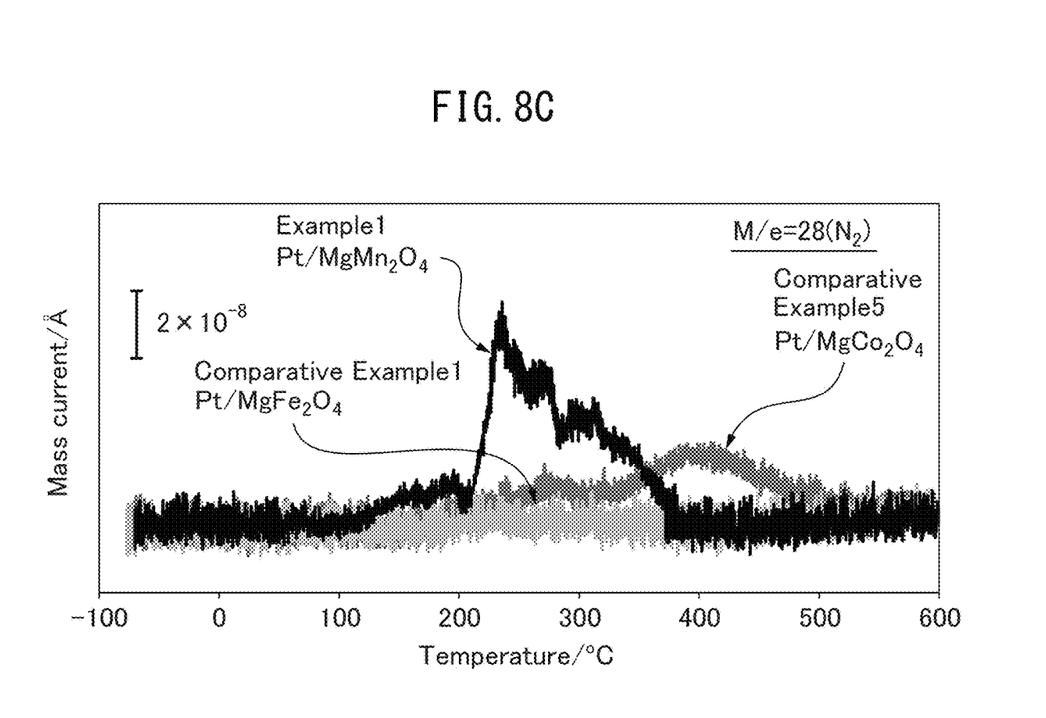
FIG. 8C is a graph showing NO-TPO analysis results for the samples of Examples 1 and Comparative Examples 1 and 5.

FIG. 8A-C shows the results of examining reactivity of formed oxygen vacancies and NO, by NO-TPO analysis of the samples of Example 1 and Comparative Examples 1 and 5, which were Pt/$MgB_2O_4$-based catalysts.

In the sample of Example 1 (Pt/$MgMn_2O_4$), $N_2O$ was formed near 0° C., and it was confirmed that the sample was able to reduce NO from the lowest temperature among the other catalysts (FIG. 8B). Moreover, $N_2$ formation was detected at 200° C. and higher with this catalyst, and the amount of formation was greater than the other catalysts (FIG. 8C).

This indicated that oxygen vacancies formed in the sample of Example 1 have the ability to reduce NO at 200° C. and below, and that oxygen vacancies formed in the catalysts supporting precious metals on Mn-containing spinel oxides have high specific NO-reducing power.

REFERENCE SIGNS LIST

10 First exhaust gas purification device
20 Second exhaust gas purification device
21 $AMn_2O_4$ Spinel-type oxide support
22 B Site
24 Oxygen atom
24' Oxygen vacancy
25 Precious metal
30a, b Flow channel
100 Exhaust gas purification system
200 Internal combustion engine

The invention claimed is:

1. An exhaust gas purification system comprising:
   a first exhaust gas purification device that purifies exhaust gas emitted from an internal combustion engine, in which a reducing agent-excess atmosphere and an oxidizing agent-excess atmosphere alternately switch with respect to a stoichiometric atmosphere, and
   a second exhaust gas purification device that further purifies the exhaust gas that has been purified by the first exhaust gas purification device, wherein:
   the first exhaust gas purification device has a three-way catalyst,
   the second exhaust gas purification device has an exhaust gas purifying catalyst that comprises an $AMn_2O_4$ spinel-type oxide support (A=Mg, Zn or Li) on which a precious metal is supported, and
   the stoichiometric atmosphere means exhaust gas in which combustion is carried out with an air/fuel ratio so that oxidizing agents such as $O_2$ and NOx and reducing agents such as CO and HC are produced in a chemical equivalence ratio.

2. The exhaust gas purification system according to claim 1, wherein the precious metal is Pt or Rh.

3. The exhaust gas purification system according to claim 1, wherein the precious metal is Rh.

4. The exhaust gas purification system according to claim 1, wherein A is Mg.

5. The exhaust gas purification system according to claim 1, wherein the $AMn_2O_4$ spinel-type oxide support is a single phase.

* * * * *